US010826198B2

(12) United States Patent
Yu et al.

(10) Patent No.: US 10,826,198 B2
(45) Date of Patent: Nov. 3, 2020

(54) CIRCUIT AND METHOD FOR ADJUSTING FREQUENCY BAND OF ANTENNA, AND ELECTRONIC DEVICE

(71) Applicant: ZTE CORPORATION, Guangdong (CN)

(72) Inventors: Xi Yu, Guangdong (CN); Jian Guo, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/303,562

(22) PCT Filed: Aug. 31, 2016

(86) PCT No.: PCT/CN2016/097713
§ 371 (c)(1),
(2) Date: Nov. 20, 2018

(87) PCT Pub. No.: WO2017/197807
PCT Pub. Date: Nov. 23, 2017

(65) Prior Publication Data

US 2019/0341701 A1 Nov. 7, 2019

(30) Foreign Application Priority Data

May 20, 2016 (CN) .......................... 2016 1 0341479

(51) Int. Cl.
*H04B 1/40* (2015.01)
*H01Q 23/00* (2006.01)
*H01Q 1/50* (2006.01)

(52) U.S. Cl.
CPC ............... *H01Q 23/00* (2013.01); *H01Q 1/50* (2013.01)

(58) Field of Classification Search
CPC ................................ H01Q 23/00; H01Q 1/50
USPC ........................................................... 455/77
See application file for complete search history.

(56) References Cited

U.S. PATENT DOCUMENTS 6,765,536 B2 * 7/2004 Phillips .................. H01Q 1/362
343/702
10,355,358 B2 * 7/2019 Desclos ................. H01Q 5/364
2015/0084817 A1 * 3/2015 Yong ...................... H01Q 1/243
343/702

FOREIGN PATENT DOCUMENTS

| | | | |
|---|---|---|---|
| CN | 1937425 | A | 3/2007 |
| CN | 202977729 | U | 6/2013 |
| CN | 103594824 | A | 2/2014 |
| CN | 103904433 | A | 7/2014 |
| WO | 2011157883 | A1 | 12/2011 |

* cited by examiner

*Primary Examiner* — Sonny Trinh
(74) *Attorney, Agent, or Firm* — Cantor Colburn LLP

(57) ABSTRACT

Provided are a circuit and method for adjusting the frequency band of an antenna, and an electronic device. The circuit includes: an antenna signal main feed-point connected to a radio frequency link; an antenna signal ground feed-point connected to a ground terminal; and a tuning device. The tuning device is electrically connected to the antenna signal main feed-point and/or the antenna signal ground feed-point, and is configured to adjust a resonance of a frequency in a radio frequency signal. The tuning device comprises a switch group and a tuning element.

17 Claims, 4 Drawing Sheets

CIRCUIT AND METHOD FOR ADJUSTING FREQUENCY BAND OF ANTENNA, AND ELECTRONIC DEVICE

CROSS REFERENCE TO RELATED APPLICATIONS

The present application is a continuing application of International Application No. PCT/CN2016/097713, filed on Aug. 31, 2016, which is based upon and claims priority to Chinese Patent Application No. 201610341479.4, filed on May 20, 2016, and the entire contents thereof are incorporated herein by reference.

TECHNICAL FIELD

The present disclosure relates to communication technologies, and in particular to a circuit and a method for adjusting a frequency band of an antenna, and an electronic device.

BACKGROUND

Due to the rapid development of the 4th Generation mobile communication technologies (4G) and different frequency bands required by various countries, there exist more and more frequency bands corresponding to antennas on smart mobile terminals, thereby resulting in increased demands on frequency bands.

Currently, smart mobile terminals are required to have slim form and light weight and powerful functions, and such requirements seriously compress the space for the antennas to use. The requirements for wider band and bad environment for the antennas of terminals contradict each other. In order to better address this problem, some solutions are needed to increase bands of antennas under poor environments, or to shift the frequencies of antennas to required bands in real time.

In related arts, tuners of manufacturers are used to optimize the antenna efficiency. The main method is to place a tuner at a position in the radio frequency link near an antenna feed-point, and the tuner mainly includes a control chip and a voltage controlled variable capacitor. The antenna is optimized by adjusting the voltage to change the capacitance value.

Alternatively, a switch is placed at a ground feed-point, and the match of the ground feed-point is switched by the switch to optimize the antenna.

However, in the tuning method using the tuner, as mentioned above, one method is to place the tuner at a position in the radio frequency link, and the loss of the tuner itself and some restrictions of traces will lead to an increase in the total path loss. On the other hand, the premise for tuning using the tuner is that the antenna bandwidth covers the required full frequency band, and on this basis, the antenna is tuned to optimize the impedance matching of the required frequency band and improve efficiency. Therefore, it is required that the antenna bandwidth is met. However, if the bandwidth cannot be met due to poor environment, the limitations of this method are manifested.

In the second method, a switch is placed at the ground feed-point. This method shows that only a certain frequency offset effect can be generated for low frequencies through various trace match debugging and experiments. This method cannot be used to solve the problem as discussed above when the high frequency bandwidth is not enough.

SUMMARY

Embodiments of the present disclosure provide a circuit and method for adjusting a frequency band of an antenna and an electronic device, so as to at least solve the problem in related arts that the antenna bandwidth cannot meet required frequency bandwidth due to limitations of antenna environment of mobile phones.

According to an embodiment of the present disclosure, there is provided a circuit for adjusting a frequency band of an antenna, including: an antenna signal main feed-point connected to a radio frequency link; an antenna signal ground feed-point connected to a ground terminal; and a tuning device; wherein: the tuning device is electrically connected to the antenna signal main feed-point and/or the antenna signal ground feed-point, and is configured to adjust a resonance of a frequency in a radio frequency signal; wherein the tuning device includes a switch group and a tuning element.

According to an exemplary embodiment, the tuning device is electrically connected to the antenna signal main feed-point and the antenna signal ground feed-point and is configured to adjust the resonance of the frequency in the radio frequency signal.

According to an exemplary embodiment, adjusting the resonance of the frequency in the radio frequency signal includes adjusting the radio frequency signal to be a high frequency signal or a low frequency signal.

According to an exemplary embodiment, the tuning device include a first tuning device and a second tuning device; wherein: the first tuning device is electrically connected to the antennal signal ground feed-point, and is configured to adjust a resonance of a first frequency in a radio frequency signal fed back by the antennal signal ground feed-point; and the second tuning device is electrically connected to the antenna signal main feed-point, and is configured to adjust a resonance of a second frequency in a radio frequency signal fed back by the antenna signal main feed-point.

According to an exemplary embodiment, the switch group is configured to turn on the tuning element; the tuning element is electrically connected to the switch group, and is configured to adjust a resonance of a frequency in a radio frequency signal fed back by the antenna signal main feed-point, and/or to adjust a resonance of a frequency in a radio frequency signal fed back by the antenna signal ground feed-point.

According to an exemplary embodiment, the switch group includes a first switch and a second switch, and the antenna signal ground feed-point includes a first antenna signal ground feed-point and a second antenna signal ground feed-point; wherein: a terminal of the first switch is electrically connected to the tuning element and the first antenna signal ground feed-point, another terminal of the first switch is electrically connected to the ground, and the first switch is configured to turn on the tuning element and tune a frequency of a first radio frequency signal which is fed back from the first antennal signal ground feed-point to the ground by the tuning element; a terminal of the second switch is electrically connected to the tuning element and the second antenna signal ground feed-point, another terminal of the second switch is electrically connected to the ground, and the second switch is configured to turn on the tuning element and tune a frequency of a second radio frequency signal which is fed back from the second antennal signal ground feed-point to the ground by the tuning element; and the first radio frequency signal and the second radio frequency signal are signals having a first frequency.

According to an exemplary embodiment, the switch group further includes a third switch, wherein: a terminal of the third switch is electrically connected to the tuning element and the antenna signal main feed-point, another terminal of the third switch is electrically connected to the radio frequency link, and the third switch is configured to turn on the tuning element and tune a frequency of a third radio frequency signal which is fed back from the antennal signal main feed-point to the ground by the tuning element, wherein the third radio frequency signal is a signal having a second frequency.

According to an exemplary embodiment, the tuning element is one or a combination of at least two of a resistor, an inductor, and a capacitor.

According to an exemplary embodiment, the switch group is one or a combination of at least two of a single pole double throw switch, a double pole double throw switch, or a third type of toggle switch.

According to another embodiment of the present disclosure, there is provided a method for adjusting a frequency band of an antenna, applied in the circuit for adjusting a frequency band of an antenna as described above, including: receiving a radio frequency signal through the antenna signal ground feed-point and the antenna signal main feed-point; and adjusting, by the switch group and the tuning element in the tuning device, a resonance of a frequency of a radio frequency signal which is fed back by the antennal signal main feed-point, and adjusting a resonance of a frequency of a radio frequency signal which is fed back by the antennal signal ground feed-point.

According to another embodiment of the present disclosure, there is provided an electronic device, including: a circuit configured to adjust a frequency band of an antenna, wherein the circuit is the circuit for adjusting a frequency band of an antenna as described above.

According to another embodiment of the present disclosure, there is provided a storage medium. The storage medium is configured to execute program codes to implement the following steps: receiving a radio frequency signal through the antenna signal ground feed-point and the antenna signal main feed-point; and adjusting, by the switch group and the tuning element in the tuning device, a resonance of a frequency of a radio frequency signal which is fed back by the antennal signal main feed-point, and adjusting a resonance of a frequency of a radio frequency signal which is fed back by the antennal signal ground feed-point.

In embodiments of the present disclosure, the tuning device is electrically connected to the antenna signal main feed-point and/or the antenna signal ground feed-point, and is configured to adjust a resonance of a frequency in a radio frequency signal. The tuning device includes a switch group and a tuning element. Thus, the present disclosure can solve the problem in related arts that the antenna bandwidth cannot meet required frequency bandwidth due to limitations of antenna environment of mobile phones, and thus cover all frequency bandwidth by extending the adjustment range of the bandwidth.

BRIEF DESCRIPTION OF THE DRAWINGS

The drawings, which constitute a part of the present disclosure, provide a further understanding of the present disclosure. The drawings along with the exemplary embodiments are used to explain the principle of the present disclosure and are not used to unduly limit the present disclosure.

DETAILED DESCRIPTION

The present disclosure will be described in detail below with reference to the drawings in conjunction with the embodiments. It should be noted that the embodiments in the present disclosure and the features in the embodiments may be combined with each other if the features in the embodiments do not conflict with each other.

It should be noted that the terms "first", "second", and the like in the specification and claims of the present disclosure are used to distinguish similar objects, and are not necessarily used to describe a particular order or sequence.

Figure 1:
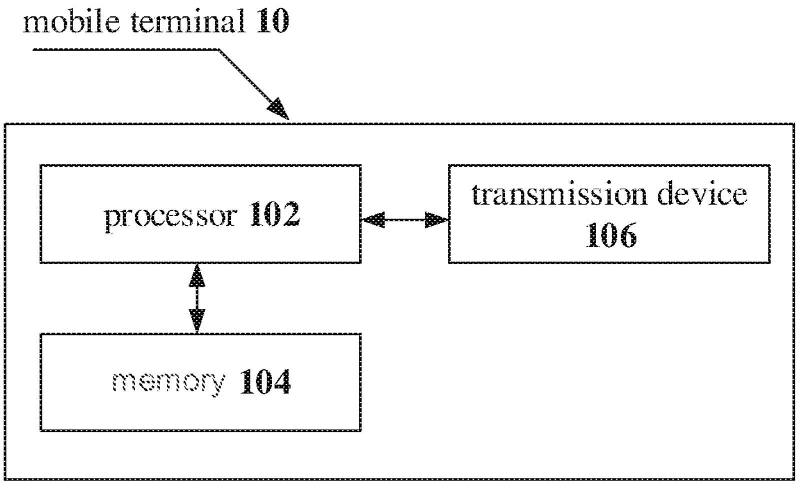
FIG. 1 is a block diagram showing hardware structure of a mobile terminal, including a circuit for adjusting a frequency band of an antenna according to an embodiment of the present disclosure.

The method according to one, non-limiting, embodiment of the present disclosure can be executed in a mobile terminal, a computer terminal or the like. Taking a mobile terminal as an example, FIG. 1 is a block diagram showing hardware structural of a mobile terminal, including a circuit for adjusting a frequency band of an antenna according to an embodiment of the present disclosure. As shown in FIG. 1, mobile terminal 10 may include one or more (only one processor is shown) processors 102 (processor(s) 102 may include, but not limited to, a processing device such as a microprocessor MCU or a programmable logic device FPGA), a memory 104 for storing data, and a transmission device 106 for communication functions. It will be understood by those skilled in the art that the structure shown in FIG. 1 is merely an example, and does not limit the structure of the electronic device. For example, the mobile terminal 10 may also include more or fewer components than those shown in FIG. 1, or have a different configuration than that shown in FIG. 1.

The memory 104 can be used to store software programs and modules of application software, such as program instructions/modules corresponding to the circuits for adjusting a frequency band of an antenna provided in the embodiment of the present disclosure. The processor(s) 102 run(s) software programs and modules stored in the memory 104 to perform various functional applications and data processing, that is, implementing the above-described circuits. The memory 104 may include high speed random access memory and may also include a non-volatile memory such as one or more magnetic storage devices, flash memory, or other non-volatile solid state memory. In some examples, the memory 104 may further include a memory remotely located relative to processor(s) 102, and the remotely located memory may be connected to mobile terminal 10 over a network. Examples of such network include, but not limited to, Internet, intranets, local area networks, mobile communication networks, and combinations thereof.

The transmission device 106 receives or transmits data via a network. An example of the network may include a wireless network provided by a communication provider of the mobile terminal 10. In one example, the transmission device 106 includes a Network Interface Controller (NIC) that can be connected to other network devices through a base station to communicate with the Internet. In one example, the transmission device 106 can be a Radio Frequency (RF) module for communicating with the Internet wirelessly.

Figure 2:
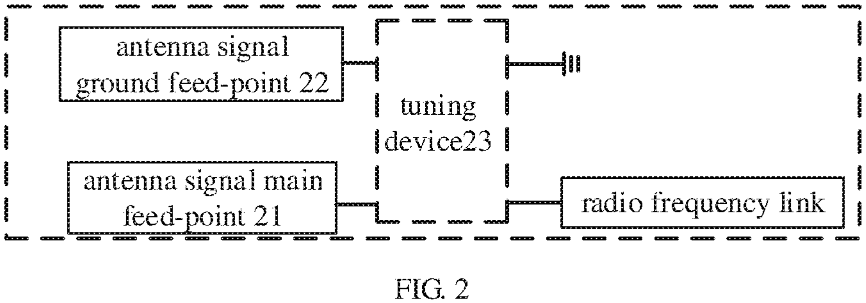
FIG. 2 is a schematic structural diagram of a circuit for adjusting a frequency band of an antenna according to an embodiment of the present disclosure.

In an embodiment, a circuit running on the mobile terminal is provided. FIG. 2 is a schematic structural diagram of a circuit for adjusting an antenna band according to an embodiment of the present disclosure. As shown in FIG. 2, the circuit includes an antenna signal main feed-point 21 connected to a radio frequency link, an antenna signal ground feed-point 22 connected to a ground terminal and a tuning device 23.

The tuning device 23 is electrically connected to the antenna signal main feed-point 21 and/or the antenna signal ground feed-point 22, and is configured to adjust a resonance of a frequency in a radio frequency signal.

The tuning device 23 includes a switch group and a tuning element.

In one example, the tuning device 23 may be connected to the antenna signal main feed-point 21 and the antenna signal ground feed-point 22 in the following ways.

In a first way, the tuning device 23 can be electrically connected to the antenna signal main feed-point 21 alone or can be connected to the antenna signal ground feed-point 22.

In a second way, the tuning device 23 is electrically connected to both the antenna signal main feed-point 21 and the antenna signal ground feed-point 22. The tuning device 23 may be electrically connected to both the antenna signal main feed-point 21 and the antenna signal ground feed-point 22 in the following manners.

In a connection manner A, the tuning device 23 may be connected to the antenna signal main feedback point 21 and the antenna signal ground feed-point 22 by separate tuning devices. That is, a tuning device 1 is connected to a link 1 to which the antenna signal main feedback point 21 belongs, and a tuning device 2 is connected to a link 2 to which the antenna signal ground feed-point 22 belongs.

In a connection manner B, the tuning device 23 in the links to which the antenna signal main feedback point 21 and the antenna signal feed-point 22 belong is the same tuning device. That is, the antenna signal main feedback point 21 and the antenna signal ground feed-point 22 are connected to the same tuning device. In an embodiment of the present disclosure, the connection manner B is taken as an example to describe the implementation of the circuit for adjusting the frequency band of the antenna provided by the embodiment of the present disclosure; however, the present disclosure is not limited to the specific connection manners.

In view of the above, the tuning device 23 is electrically connected to the antenna signal main feed-point 21, and is configured to adjust a resonance of a frequency in a radio frequency signal fed back by the antenna signal main feed-point 21.

The tuning device 23 is electrically connected to antennal signal ground feed-point 22, and is configured to adjust a resonance of a first frequency in a radio frequency signal fed back by the antennal signal ground feed-point 22.

In one example, the circuit for adjusting a frequency band of an antenna provided by the embodiment of the present disclosure may be applicable to the fourth generation mobile communication system (4G) and the forthcoming fifth generation mobile communication system (5G), and may be particularly applicable to a mobile terminal. The mobile terminal in the embodiment of the present disclosure may be a terminal device with a radio frequency antenna, such as a smart phone, a tablet computer, a smart wearable device, a notebook computer, or a personal PC, and so on.

In the circuit for adjusting a frequency band of an antenna provided by the embodiment of the present disclosure, by configuring the tuning device 23, the resonance of the frequency of the radio frequency signal of the antenna signal main feed-point 21 and the antenna signal feed-point 22 is tuned, so that the circuit for adjusting a frequency band of an antenna can meet the requirement of the LTE system frame structure to transmit multiple services in the same or different frequency bands.

When the antenna signal feed-point 21 and/or the antenna signal feed-point 22 receives the antenna signals, the signal flow direction is that the signals are transmitted from the antenna signal main feed-point 21 to the radio frequency link, and/or, the signals are transmitted from the antenna signal ground feed-point 22 to the ground terminal. Conversely, when the mobile terminal transmits the antenna signals, the signal flow direction is that the signals are transmitted from the radio frequency link to the antenna signal main feedback point 21, and/or the signals are transmitted from the ground terminal to the antenna signal ground feed-point 22.

In the circuit for adjusting a frequency band of an antenna provided by embodiments of the present disclosure, the tuning device is electrically connected to the antenna signal main feed-point and/or the antenna signal ground feed-point, and is configured to adjust a resonance of a frequency in a radio frequency signal. The tuning device includes a switch group and a tuning element. Thus, the present disclosure can solve the problem in related arts that the antenna bandwidth cannot meet required frequency bandwidth due to limitations of antenna environment of mobile phones, and thus cover all frequency bandwidth by extending the adjustment range of the bandwidth.

According to an exemplary embodiment, the tuning device 23 is electrically connected to the antenna signal main feed-point 21 and the antenna signal ground feed-point 22, and is configured to adjust the resonance of the frequency in the radio frequency signal.

Further, according to an exemplary embodiment, adjusting the resonance of the frequency in the radio frequency signal includes adjusting the radio frequency signal to be a high frequency signal or a low frequency signal. According to an exemplary embodiment, the tuning device 23 includes a first tuning device and a second tuning device.

The first tuning device is electrically connected to the antennal signal ground feed-point 22, and is configured to adjust a resonance of a first frequency in a radio frequency signal fed back by the antennal signal ground feed-point 22.

The second tuning device is electrically connected to the antenna signal main feed-point 21, and is configured to adjust a resonance of a second frequency in a radio frequency signal fed back by the antenna signal main feed-point 21.

The second frequency is higher than the first frequency, or the second frequency is lower than the first frequency.

In the embodiments of the present disclosure, the antenna signal main feed-point 21 can be configured to adjust the high frequency signal, and the antenna signal ground feed-point 22 can be configured to adjust the low frequency signal. However, the present disclosure is not limited to this, and other configures which can implement the circuit for adjusting antenna frequency band can also be used.

Figure 3:
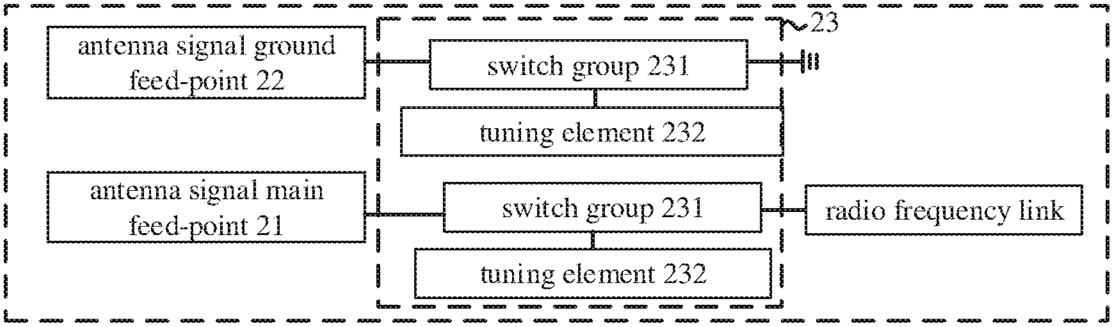
FIG. 3 is a schematic structural diagram of a circuit for adjusting a frequency band of an antenna according to an embodiment of the present disclosure.

FIG. 3 is a schematic structural diagram of a circuit for adjusting a frequency band of an antenna according to an embodiment of the present disclosure. As shown in FIG. 3, the circuit for adjusting a frequency band of an antenna provided by the embodiment of the present disclosure is described as follows:

According to an exemplary embodiment, the tuning device 23 includes a switch group 231 and a tuning element 232. The switch group 231 is configured to turn on the tuning element 232. The tuning element 232 is electrically connected to the switch group 231, and is configured to adjust a resonance of a frequency in a radio frequency signal fed back by the antenna signal main feed-point 21, and/or to adjust a resonance of a frequency in a radio frequency signal fed back by the antenna signal ground feed-point 22.

Further, according to an exemplary embodiment, the switch group 231 includes a first switch and a second switch. The antenna signal ground feed-point 22 includes a first antenna signal ground feed-point and a second antenna signal ground feed-point.

A terminal of the first switch is electrically connected to the tuning element and the first antenna signal ground feed-point, another terminal of the first switch is electrically connected to the ground terminal, and the first switch is configured to turn on the tuning element 232 and tune a frequency of a first radio frequency signal which is fed back from the first antennal signal ground feed-point to the ground by the tuning element 232. In other words, if the first switch is turned on, the tuning element 232 is connected in the path and starts to work, that is, the tuning element 232 is "turned on".

A terminal of the second switch is electrically connected to the tuning element 232 and the second antenna signal ground feed-point, another terminal of the second switch is electrically connected to the ground terminal, and the second switch is configured to turn on the tuning element 232 and tune a frequency of a second radio frequency signal which is fed back from the second antennal signal ground feed-point to the ground by the tuning element 232. In other words, if the second switch is turned on, the tuning element 232 is connected in the path and starts to work, that is, the tuning element 232 is "turned on".

The first radio frequency signal and the second radio frequency signal are signals having a first frequency.

In one example, the tuning element 232 further includes a first element and a second element, or the tuning element 232 includes a third element and a fourth element. The first element and the second element are electrically connected to the first switch and configured to tune a frequency resonance of a first radio frequency signal which is fed back by the first antennal signal ground feed-point. The third element and the fourth element are electrically connected to the second switch, and configured to tune a frequency resonance of a second radio frequency signal which is fed back by the second antennal signal ground feed-point.

According to an exemplary embodiment, the switch group 231 further includes a third switch.

A terminal of the third switch is electrically connected to the tuning element 232 and the antenna signal main feed-point 21, another terminal of the third switch is electrically connected to the radio frequency link, and the third switch is configured to turn on the tuning element 232 and tune a frequency of a third radio frequency signal which is fed back from the antennal signal main feed-point 21 to the ground by the tuning element. The third radio frequency signal is a signal having a second frequency.

In one example, the tuning element 232 includes a fifth element and a sixth element. The fifth element and the sixth element are electrically connected to the third switch, and are configured to tune a frequency resonance of a third radio frequency signal which is fed back by the antennal signal main feed-point 21.

According to an exemplary embodiment, the tuning element 232 is one or a combination of at least two of a resistor, an inductor, and a capacitor.

According to an exemplary embodiment, the switch group 231 is one or a combination of at least two of a single pole double throw switch, a double pole double throw switch, or a third type of switch.

As can be seen from the above embodiments in conjunction with FIG. 2 and FIG. 3, in the circuit for adjusting a frequency band of an antenna provided by the embodiments of the present disclosure, with the combination of the turning-on and turning-off of switches in the switch group in the tuning device 23, by turning on the tuning element 232 which is connected to the switches, the frequencies of the radio frequency signals which are fed back by the antennal signal main feed-point 21 and the antenna signal ground feed-point 22 are tuned. Thus, the present disclosure can meet the requirement of the LTE system frame structure to transmit multiple services in the same or different frequency bands.

Further, when the adjustment value of the tuning element in the tuning device 23 electrically connected to the antenna signal ground feed-point 22 is the same as the grounding effect of the antenna signal ground feed-point 22, the tuning element in the tuning device 23 can be eliminated.

Figure 4:
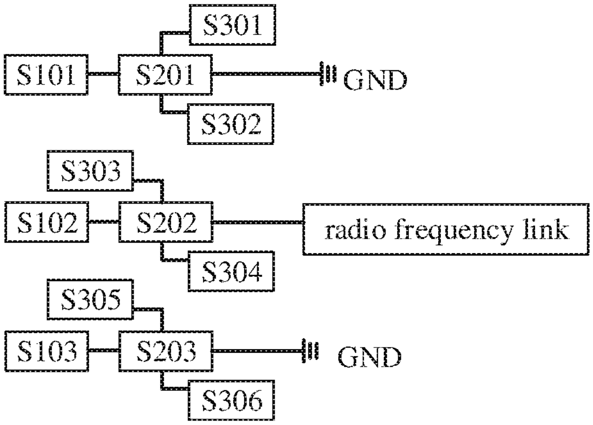
FIG. 4 is a schematic structural diagram of a circuit for adjusting a frequency band of an antenna according to an embodiment of the present disclosure.

In summary, in circuit for adjusting the frequency band of the antenna provided by the embodiments of the present disclosure, by adding the combination of tuning switches at the antenna signal main feed-point and ground feed-point, the high and low frequency bands of the antenna can be frequency-shifted, so as to meet the requirement of bandwidth. Example implementation is as follows:

FIG. 4 is a schematic structural diagram of a circuit for adjusting a frequency band of an antenna according to an embodiment of the present disclosure. As shown in FIG. 4, S102 is an antenna main feed-point (i.e., an antenna signal main feed-point 21 in embodiments of the present disclosure). S101 and S103 are the antenna ground feed-points (i.e., the first antenna signal ground feed-point and the second antenna signal ground feed-point in the antenna signal ground feed-point 22 in embodiments of the present disclosure). S201/S202/S203 are an antenna switches (2T switch is shown in the schematic diagram, which can be replaced by 2T/4T or other types of switch in actual uses), that is, the first switch, the third switch and the second switch in the switch group 231 in embodiments of the present disclosure.

Figure 5:
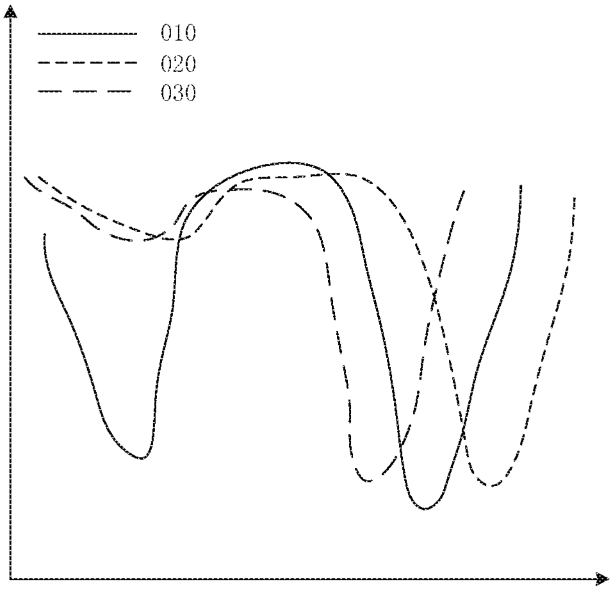
FIG. 5 is a schematic diagram showing an effect of using a path tuning switch for an antenna signal main feed-point in a circuit for adjusting an antenna band according to an embodiment of the present disclosure.

As shown in FIG. 4, the tuning switch S202 on the link close to the main feed-point S102 is switched so that the link of S303 or S304 (i.e., the fifth element and the sixth element in embodiments of the present disclosure) is turned on. S303 and S304 are resistors, inductors, or capacitor devices having different (resistance, inductance, or capacitance) values. By switching between the two links, the high frequency resonance of the antenna can be tuned. FIG. 5 is a schematic diagram showing an effect of using a path tuning switch for an antenna signal main feed-point in a circuit for adjusting an antenna band according to an embodiment of the present disclosure. The effect is shown in FIG. 5. The original curve is 010, and the tuned curve is 020 or 030.

Figure 6:
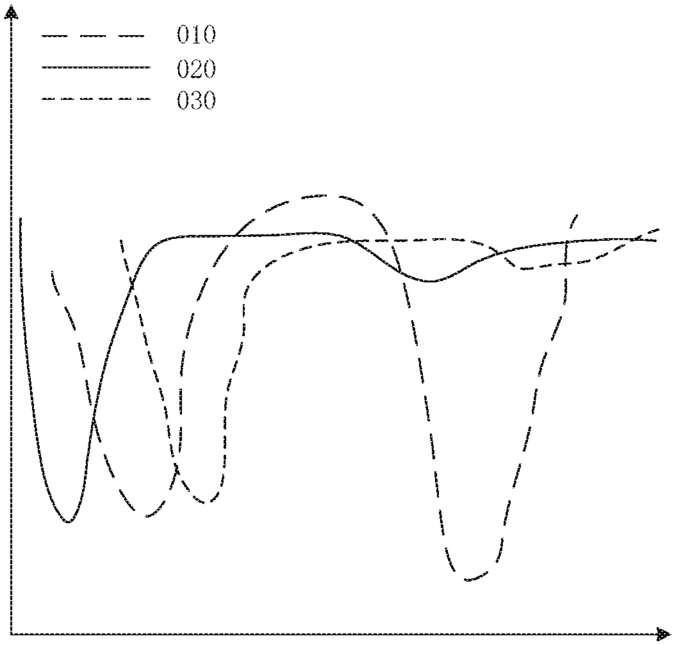
FIG. 6 is a schematic diagram showing an effect of using a switch group including path tuning switches for an antenna signal main feed-point and/or an antenna signal ground feed-point in a circuit for adjusting an antenna band according to an embodiment of the present disclosure.

The tuning switch S201/S203 on the path close to the ground feed-point S101/S103 is switched so that one of the links corresponding to S301/S302/S305/S306 (i.e., the first element, the second element, the third element and the fourth element in embodiments of the present disclosure) is turned on. S301, S302, S305, S306 resistors, inductors, or capacitor devices having different (resistance, inductance, or capacitance) values. By switching between the two links, the low frequency resonance of the antenna can be tuned. FIG. 6 is a schematic diagram showing an effect of using a switch group including path tuning switches for an antenna signal main feed-point and/or an antenna signal ground feed-point in a circuit for adjusting an antenna band according to an embodiment of the present disclosure. The effect is as shown in FIG. 6. The original curve is 010 and the tuned curve is 020 or 030.

The combination of the tuning switches S101, S102, and S103 can tune high and low frequency resonance of the antenna. The antenna's resonant frequency is shifted to achieve coverage of all frequency bands required by the antenna. In the implementation of the present disclosure, the electrical element type of the tuning element 232 may be the same type, or may be a combination of different types of elements, to implement the circuit for adjusting the antenna frequency band provided by the embodiment of the present disclosure, and the present disclosure does not impose specific limitations on this.

In addition, in the circuit for adjusting a frequency band of an antenna provided by the embodiment of the present disclosure, the tuning switch(s) is(are) 2T switches, that is, when switching between two states is needed, the 2T switches may be used. According to the requirements in debugging, the 2T switch(s) can be replaced with 4T switches or other types of switches which can be used to realize switching among different states of the radio frequency links.

In the circuit for adjusting a frequency band of an antenna provided by the embodiment of the present disclosure, a combination of one feed-point+two feed-points is used. According to the requirements of debugging and antenna routing, different numbers of feed-points and different positions for the feed-points may also be employed.

It should be noted that the circuit for adjusting the frequency band of the antenna provided by the embodiment of the present disclosure may also be applicable to the case of one feed-point+N feed-points, where N is greater than 1, and is an integer. That is, the embodiments of the present disclosure are described using the example of the combination of one feed-point+two feed-points; however, the present disclosure is not limited to this and other configures which can be used to implement the circuit for adjusting a frequency band of an antenna can also be used.

As can be seen from the above, in the circuit for adjusting a frequency band of an antenna provided by the embodiment of the present disclosure, when the bandwidth cannot cover the requirements of all the frequency bands, the shift of the antenna frequency resonance point is adjusted by switching the switches, and in use, quick switching can be realized according to current network environments. In addition, the differential loss of the switches themselves is very small, and has no significant effect on the overall loss of the path.

Through the description of the above embodiments, those skilled in the art can clearly understand that the method according to the foregoing embodiments can be implemented by means of software plus a necessary general hardware platform, and of course, can also be implemented by hardware, but in many cases the former is a better implementation. Based on such understanding, the parts of the technical solutions of the present disclosure, which are essential or contribute to the prior art, may be embodied in the form of a software product stored in a storage medium (such as ROM/RAM, a magnetic disk, an optical disc), which includes a number of instructions for causing a terminal device (which may be a cell phone, a computer, a server, or a network device, etc.) to perform the methods described in various embodiments of the present disclosure.

Figure 7:
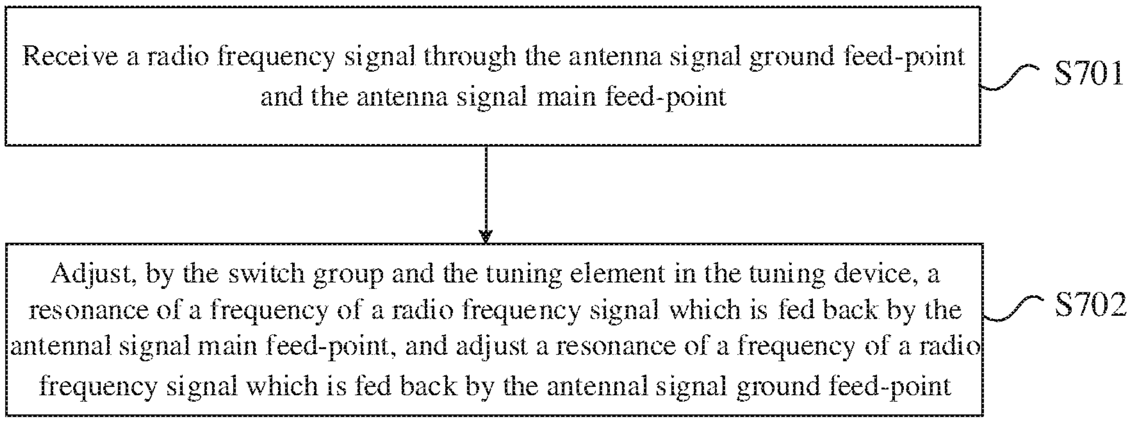
FIG. 7 is a flow chart of a method for adjusting a frequency band of an antenna according to an embodiment of the present disclosure.

In another, non-limiting, embodiment, a method running on the mobile terminal as described above is provided. FIG. 7 is a flowchart of a method for adjusting a frequency band of an antenna according to an embodiment of the present disclosure. As shown in FIG. 7, the process includes the following steps:

In step S701, a radio frequency signal is received through the antenna signal ground feed-point and the antenna signal main feed-point.

In step S702, by the switch group and the tuning element in the tuning device, a resonance of a frequency of a radio frequency signal which is fed back by the antennal signal main feed-point is adjusted or tuned, and a resonance of a frequency of a radio frequency signal which is fed back by the antennal signal ground feed-point is adjusted or tuned.

In conjunction with steps S701 and S702 and the circuit shown in FIG. 2 to FIG. 6 for adjusting a frequency band of an antenna, in the method for adjusting a frequency band of an antenna provided by the embodiment of the present disclosure, the tuning device 23 is configured to tune the frequency resonance of the radio frequency signals of the antenna signal main feed-point 21 and the antennal signal ground feed-point 22. Thus, the circuit for adjusting a frequency band of an antenna can meet the requirement of the LTE system frame structure to transmit multiple services in the same or different frequency bands.

In the method for adjusting a frequency band of an antenna provided by an embodiment of the present disclosure, a radio frequency signal is received through the antenna signal ground feed-point and the antenna signal main feed-point, and by the switch group and the tuning element in the tuning device, a resonance of a frequency of a radio frequency signal which is fed back by the antennal signal main feed-point is tuned, and a resonance of a frequency of a radio frequency signal which is fed back by the antennal signal ground feed-point is tuned. Thus, the present disclosure can solve the problem in related arts that the antenna bandwidth cannot meet required frequency bandwidth due to limitations of antenna environment of mobile phones, and thereby cover all frequency bandwidth by extending the adjustment range of the bandwidth.

According to an exemplary embodiment, the tuning device includes a switch group and a tuning component.

The tuning element is turned on by the switch group.

By the turned-on tuning element, the resonance of the frequency in the radio frequency signal which is fed back by the antennal signal main feed-point is tuned, and/or the resonance of the frequency in the radio frequency signal which is fed back by the antennal signal ground feed-point is tuned.

In another, non-limiting, embodiment, an electronic device is provided. The electronic device includes a circuit configured to adjust a frequency band of an antenna. The circuit may be the circuit for adjust a frequency band of an antenna as shown in FIG. 2 to FIG. 6.

An embodiment of the present disclosure also provides a storage medium. In this embodiment, the storage medium may be configured to store program codes for performing the following steps:

In S1, a radio frequency signal is received through the antenna signal ground feed-point and the antenna signal main feed-point.

In S2, by the switch group and the tuning element in the tuning device, a resonance of a frequency of a radio frequency signal which is fed back by the antennal signal main feed-point is tuned, and a resonance of a frequency of a radio frequency signal which is fed back by the antennal signal ground feed-point is tuned.

Optionally, in this embodiment, the foregoing storage medium may be configured to store program codes for performing the following steps:

The tuning device includes a switch group and a tuning component.

In S1, the tuning element is turned on through the switch group.

In S2, by the turned-on tuning element, the resonance of the frequency in the radio frequency signal which is fed back by the antennal signal main feed-point is tuned, and/or the resonance of the frequency in the radio frequency signal which is fed back by the antennal signal ground feed-point is tuned.

Optionally, in this embodiment, the storage medium may include, but is not limited to, a USB flash drive, a Read-Only Memory (ROM), a Random Access Memory (RAM), a mobile hard disk, a magnetic disk, or an optical disk, or other medium which can store program codes.

The details regarding the medium embodiments can be found in the previous descriptions regarding the method and device embodiments, and repeated descriptions are omitted here.

It will be apparent to those skilled in the art that the various modules or steps of the present disclosure described above can be implemented by a general-purpose computing device, which can be centralized on a single computing device or distributed across a network composed of multiple computing devices. Alternatively, the modules may be implemented by program codes executable by the computing device such that they may be stored in a storage device. In some cases, the steps may be performed in different orders from that described herein. The modules shown or described are performed or fabricated separately into individual integrated circuit modules, or a plurality of modules or steps may be fabricated as a single integrated circuit module. Thus, the present disclosure is not limited to any specific combination of hardware and software.

The above description is only exemplary embodiments of the present disclosure, and is not intended to limit the present disclosure. Various modifications and changes can be made to the present disclosure. Any modifications, equivalent substitutions, improvements, and so on made within the spirit and scope of the present disclosure are intended to be included within the scope of the present disclosure.

In technical solutions provided by embodiments of the present disclosure, the tuning device is electrically connected to the antenna signal main feed-point and/or the antenna signal ground feed-point, and is configured to adjust a resonance of a frequency in a radio frequency signal. The tuning device includes a switch group and a tuning element. Thus, the present disclosure can solve the problem in related arts that the antenna bandwidth cannot meet required frequency bandwidth due to limitations of antenna environment of mobile phones, and thus cover all frequency bandwidth by extending the adjustment range of the bandwidth.

What is claimed is:

1. A circuit for adjusting a frequency band of an antenna, comprising:

an antenna signal main feed-point connected to a radio frequency link;

an antenna signal ground feed-point connected to a ground terminal; and a tuning device electrically connected to at least one of the antenna signal main feed-point and the antenna signal ground feed-point, the tuning device being configured to adjust a resonance of a frequency in a radio frequency signal, and including a switch group and a tuning element, wherein the tuning device includes a first tuning device and a second tuning device, the first tuning device is electrically connected to the antennal signal ground feed-point and is configured to adjust a resonance of a first frequency in a radio frequency signal fed back by the antennal signal ground feed-point, and the second tuning device is electrically connected to the antenna signal main feed-point and is configured to adjust a resonance of a second frequency in a radio frequency signal fed back by the antenna signal main feed-point.

2. The circuit of claim 1, wherein the tuning device is electrically connected to the antenna signal main feed-point and the antenna signal ground feed-point.

3. The circuit of claim 2, wherein adjusting the resonance of the frequency in the radio frequency signal comprises adjusting the radio frequency signal to be one of a high frequency signal and a low frequency signal.

4. The circuit of claim 1, wherein the switch group is configured to turn on the tuning element, and the tuning element is electrically connected to the switch group, and wherein the tuning element is configured to adjust at least one of a resonance of a frequency in a radio frequency signal fed back by the antenna signal main feed-point, and a resonance of a frequency in a radio frequency signal fed back by the antenna signal ground feed-point.

5. The circuit of claim 4, wherein the switch group includes a first switch and a second switch, and the antenna signal ground feed-point includes a first antenna signal ground feed-point and a second antenna signal ground feed-point, wherein a terminal of the first switch is electrically connected to the tuning element and the first antenna signal ground feed-point, another terminal of the first switch is electrically connected to the ground terminal, and the first switch is configured to turn on the tuning element and tune a frequency of a first radio frequency signal which is fed back from the first antennal signal ground feed-point to the ground by the tuning element, wherein a terminal of the second switch is electrically connected to the tuning element and the second antenna signal ground feed-point, another terminal of the second switch is electrically connected to the ground terminal, and the second switch is configured to turn on the tuning element and tune a frequency of a second radio frequency signal which is fed back from the second antennal signal ground feed-point to the ground terminal by the tuning element, and wherein the first radio frequency signal and the second radio frequency signal are signals having a first frequency.

6. The circuit of claim 5, wherein the switch group includes a third switch includes first and second terminals, the first terminal being electrically connected to the tuning element and the antenna signal main feed-point, the second terminal being electrically connected to the radio frequency link, and the third switch is configured to turn on the tuning element and tune a frequency of a third radio frequency signal which is fed back from the antennal signal main feed-point to the ground by the tuning element, and wherein the third radio frequency signal is a signal having a second frequency.

7. The circuit of claim 1, wherein the tuning element is one or a combination of at least two of a resistor, an inductor, and a capacitor.

8. The circuit of claim 1, wherein the switch group is one or a combination of at least two of a single pole double throw switch, a double pole double throw switch, or a type of toggle switch capable of turning on the tuning element.

9. A method for adjusting a frequency band of an antenna applied in a circuit, the method comprising:

receiving a radio frequency signal through an antenna signal ground feed-point and an antenna signal main feed-point; and adjusting, by a switch group and a tuning element, a resonance of a frequency of a radio frequency signal fed back by the antennal signal main feed-point; and adjusting a resonance of a frequency of a radio frequency signal fed back by the antennal signal ground feed-point, wherein the antenna signal main feed-point is connected to a radio frequency link, and the antenna signal ground feed-point is connected to a ground terminal, and wherein a tuning device includes the switch group and the tuning element, and is electrically connected to at least one of the antenna signal main feed-point and the antenna signal ground feed-point, wherein the tuning device includes a first tuning device and a second tuning device, the first tuning device is electrically connected to the antennal signal ground feed-point and is configured to adjust a resonance of a first frequency in a radio frequency signal fed back by the antennal signal ground feed-point, and the second tuning device is electrically connected to the antenna signal main feed-point and is configured to adjust a resonance of a second frequency in a radio frequency signal fed back by the antenna signal main feed-point.

10. An electronic device, comprising:

a circuit for adjusting a frequency band of an antenna which comprises:

an antenna signal main feed-point connected to a radio frequency link;

an antenna signal ground feed-point connected to a ground terminal; and a tuning device electrically connected to at least one of the antenna signal main feed-point and the antenna signal ground feed-point, and is configured to adjust a resonance of a frequency in a radio frequency signal, and the tuning device including a switch group and a tuning element;

wherein the tuning device includes a first tuning device and a second tuning device, the first tuning device is electrically connected to the antennal signal ground feed-point and is configured to adjust a resonance of a first frequency in a radio frequency signal fed back by the antennal signal ground feed-point, and the second tuning device is electrically connected to the antenna signal main feed-point and is configured to adjust a resonance of a second frequency in a radio frequency signal fed back by the antenna signal main feed-point.

11. The electronic device of claim 10, wherein the tuning device is electrically connected to the antenna signal main feed-point and the antenna signal ground feed-point and is configured to adjust the resonance of the frequency in the radio frequency signal.

12. The electronic device of claim 11, wherein adjusting the resonance of the frequency in the radio frequency signal comprises adjusting the radio frequency signal to be a high frequency signal or a low frequency signal.

13. The electronic device of claim 10, wherein the switch group is configured to turn on the tuning element, and the tuning element is electrically connected to the switch group and is configured to adjust at least one of a resonance of a frequency in a radio frequency signal fed back by the antenna signal main feed-point and a resonance of a frequency in a radio frequency signal fed back by the antenna signal ground feed-point.

14. The electronic device of claim 13, wherein the switch group includes a first switch and a second switch, the antenna signal ground feed-point includes a first antenna signal ground feed-point and a second antenna signal ground feed-point, the first switch includes first and second terminals, the first terminal electrically connected to the tuning element and the first antenna signal ground feed-point, the second terminal electrically connected to the ground terminal, and the first switch is configured to turn on the tuning element and tune a frequency of a first radio frequency signal which is fed back from the first antennal signal ground feed-point to the ground by the tuning element, wherein the second switch includes a third terminal and a fourth terminal, the third terminal electrically connected to the tuning element and the second antenna signal ground feed-point, the fourth terminal electrically connected to the ground terminal, and the second switch being configured to turn on the tuning element and tune a frequency of a second radio frequency signal which is fed back from the second antennal signal ground feed-point to the ground terminal by the tuning element, and wherein the first radio frequency signal and the second radio frequency signal are signals having a first frequency.

15. The electronic device of claim 14, wherein the switch group includes a third switch including a fifth terminal and a sixth terminal, the fifth terminal electrically connected to the tuning element and the antenna signal main feed-point, the sixth terminal electrically connected to the radio frequency link, wherein the third switch is configured to turn on the tuning element and tune a frequency of a third radio frequency signal which is fed back from the antennal signal main feed-point to the ground by the tuning element, and wherein the third radio frequency signal is a signal having a second frequency.

16. The electronic device of claim 10, wherein the tuning element is one or a combination of at least two of a resistor, an inductor, and a capacitor.

17. The electronic device of claim 10, wherein the switch group is one or a combination of at least two of a single pole double throw switch, a double pole double throw switch, or a type of toggle switch adapted to turn on the tuning element.

* * * * *